(12) United States Patent
Ku

(10) Patent No.: US 6,405,859 B1
(45) Date of Patent: Jun. 18, 2002

(54) OPTICAL DISC HOLDER

(75) Inventor: Chia-Chun Ku, Taipei (TW)

(73) Assignee: Sinta Technology Corp., Taipei Hsien (TW)

( * ) Notice: Subject to any disclaimer, the term of this patent is extended or adjusted under 35 U.S.C. 154(b) by 0 days.

(21) Appl. No.: 09/678,325

(22) Filed: Oct. 3, 2000

Related U.S. Application Data

(63) Continuation-in-part of application No. 09/458,025, filed on Dec. 10, 1999, now abandoned.

(51) Int. Cl.$^7$ .............................................. B65D 85/57
(52) U.S. Cl. .................................... 206/308.1; 206/310
(58) Field of Search ............................ 206/308.1, 309, 206/310, 303, 493; 211/40, 41.12

(56) References Cited

U.S. PATENT DOCUMENTS

| | | | |
|---|---|---|---|
| 5,533,615 A | 7/1996 | McCamy | |
| 5,685,425 A * | 11/1997 | Choi | 206/310 |
| 5,845,771 A | 12/1998 | Fu | |
| 5,924,564 A | 7/1999 | Lin | |
| 5,938,020 A | 8/1999 | Luckow | |
| 6,283,285 B1 * | 9/2001 | Ikebe et al. | 206/310 |

* cited by examiner

*Primary Examiner*—David T. Fidei
(74) *Attorney, Agent, or Firm*—Birch, Stewart, Kolasch & Birch, LLP

(57) ABSTRACT

An optical disc holder according to the present invention includes a carrier plate having a longitudinal measurement larger than the diameter of the stored disc, and a latitudinal measurement smaller than the diameter thereof. At least a carrying portion and a resilient portion are formed on opposite positions along the longitudinal direction on one side of the carrier plate for holding the rim of the disc by resilient force of the resilient portion. At a longitudinal end of the carrier plate, a hook is formed for hanging the optical disc holder to a rod, a rope or other suitable elements.

10 Claims, 5 Drawing Sheets

OPTICAL DISC HOLDER

This application is a continuation in part of Ser. No. 09/458,025 filed Dec. 10, 1999, now abandoned.

BACKGROUND OF THE INVENTION

1. Field of Invention

The present invention generally relates to a device for storing optical discs, and more particularly relates to a holder that can hold firmly at least an optical disc by the rim of the disc and can be hung on a rod settled in the drawer, storing cabinet or supporting frame.

2. Related Art

Optical discs, such as compact discs, versatile compact discs and CD-ROMs, are now a kind of widely used information storage media in our daily life. As the optical discs are used, means for storing optical discs and preventing them from being spoiled or damaged are also required and developed. Common storage means for optical discs include portable cartridges each for holding one or two discs, and storage towers or cabinets, which includes a plurality of carriers for holding and arranging several optical discs.

Currently, an optical disc is generally a round plane disc with a diameter of about 120 mm and having a central through hole. Outside the center hole, there is a circular disused portion with a width of about 15 mm. Outside the center disused portion, there is the circular data portion. Finally, at the periphery of the disc, there is a circular outer disused portion having a width of about 1 mm. To prevent the disc from being spoiled or damaged, an optical disc can be generally stored in a disc cartridge, as shown in FIG. 1. Some grasping fingers are formed in the center portion of the disc cartridge for holding the disc at the center hole and free the disc from contacting its data and reflective surfaces to the surfaces of the cartridge. The grasping fingers have to be elastic and strong enough for fixing the disc in position by the center hole. The center hole is an ideal portion for holding the disc since the adjacent disused portion has no data formed thereon. The cartridges are commonly made of plastics by an injection molding process, and utilize the elastic characteristics of the plastics for the grasping force.

The aforesaid conventional disc cartridge is composed of three components, i.e., a base, a cover, and a grasping member. The more components cost more material, and require assembly time and cost after molding. So, they will increase the cost of production. Also, when using, the user has to push the disc into or pull it out from the grasping fingers of the cartridge with a certain force against the grasping force of the fingers. Therefore, unsuitable force may be applied to the disc and cause a bending or even damage to the disc.

Some similar kinds of disc cartridge are disclosed in U.S. Pat. Nos. 5,533,615; 5,845,771; 5,924,564 and 5,938,020.

In U.S. Pat. No. 5,533,615, a disk storage case also comprises a cover, a planar surface with a receptacle. and retention means. The retention means include a fixed lip and a pivotable lip operated by a button. Instead of conventional retention means at the center hole, the retention means work at the rim of the disc. But the components increase and still cause complicated assembly and higher cost.

In U.S. Pat. No. 5,924,564, the disk storage device applicable to a disc cartridge includes a bottom shell, an upper shell and a disc holder plate. A further spring element is fastened to the disc holder plate for imparting a pressure to the stored disc and causing the center hole of the stored disc to be firmly retained in engagement with a retainer flange adapted to engage the center hole of the stored disc. The components are still more complicated and costly.

SUMMARY OF THE INVENTION

It is therefore an object of the present invention to provide a holder that can hold at least an optical disc by the rim of the disc. The holder is of a plate shape having a clip portion for holding the disc, and a hook to be hung for storage.

An optical disc holder according to the present invention includes a carrier plate having a longitudinal measurement larger than the diameter of the stored disc, and a latitudinal measurement smaller than the diameter thereof. At least a carrying portion and a resilient portion are formed on opposite positions along the longitudinal direction on one side of the carrier plate for holding the rim of the disc by the resilient force of the resilient portion. At a longitudinal end of the carrier plate, the unitary hook is formed for hanging the optical disc holder to a rod, a rope or other suitable elements.

Further scope of applicability of the present invention will become apparent from the detailed description given hereinafter. However. it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

The present invention provides a simpler construction for storing optical discs. And making use of direct form to let the present invention become only one component that could hold at least an optical disc by the rim of the disc.

Figure 1:
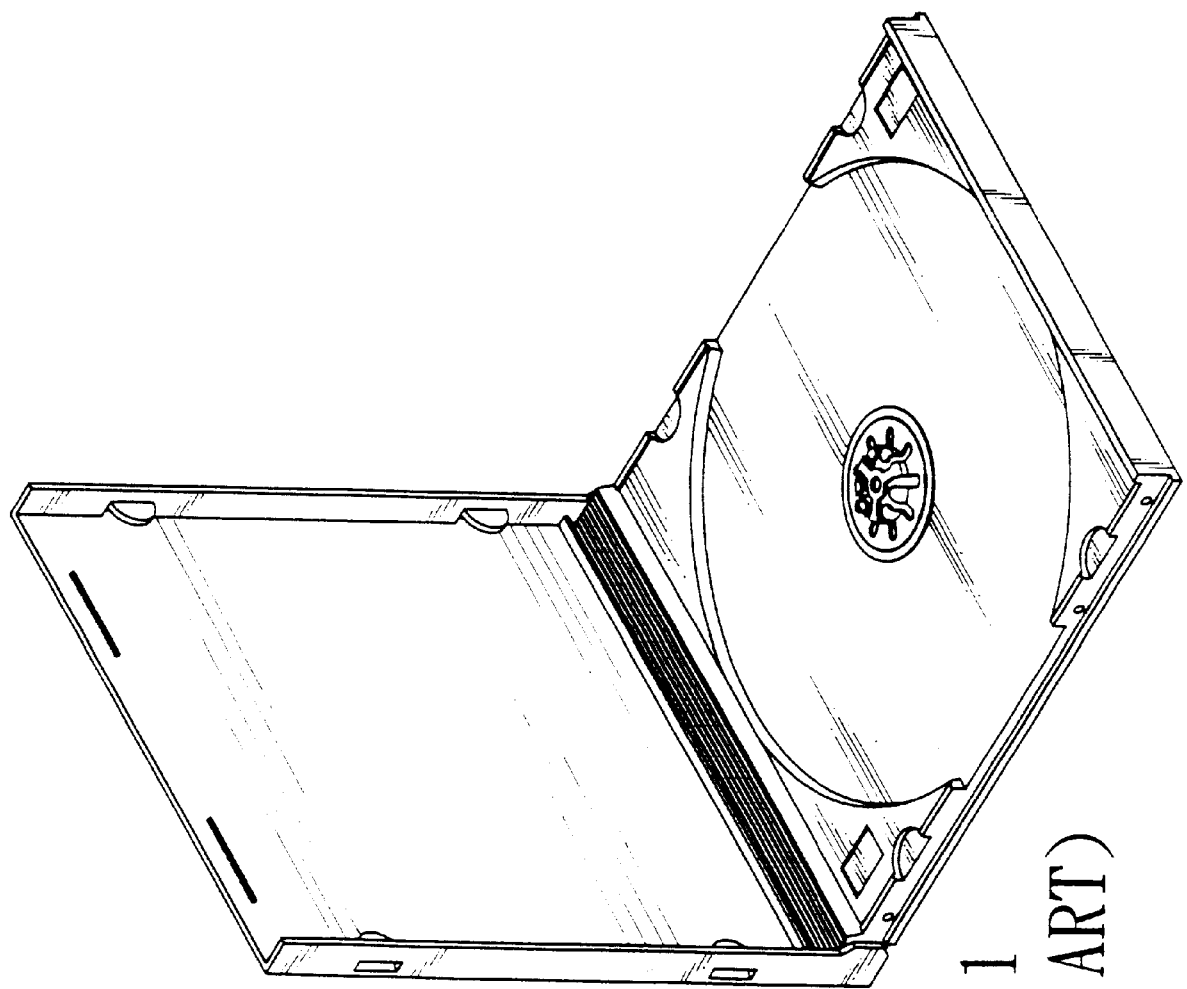
FIG. 1 is a perspective view of a conventional disc cartridge.
Figure 2:
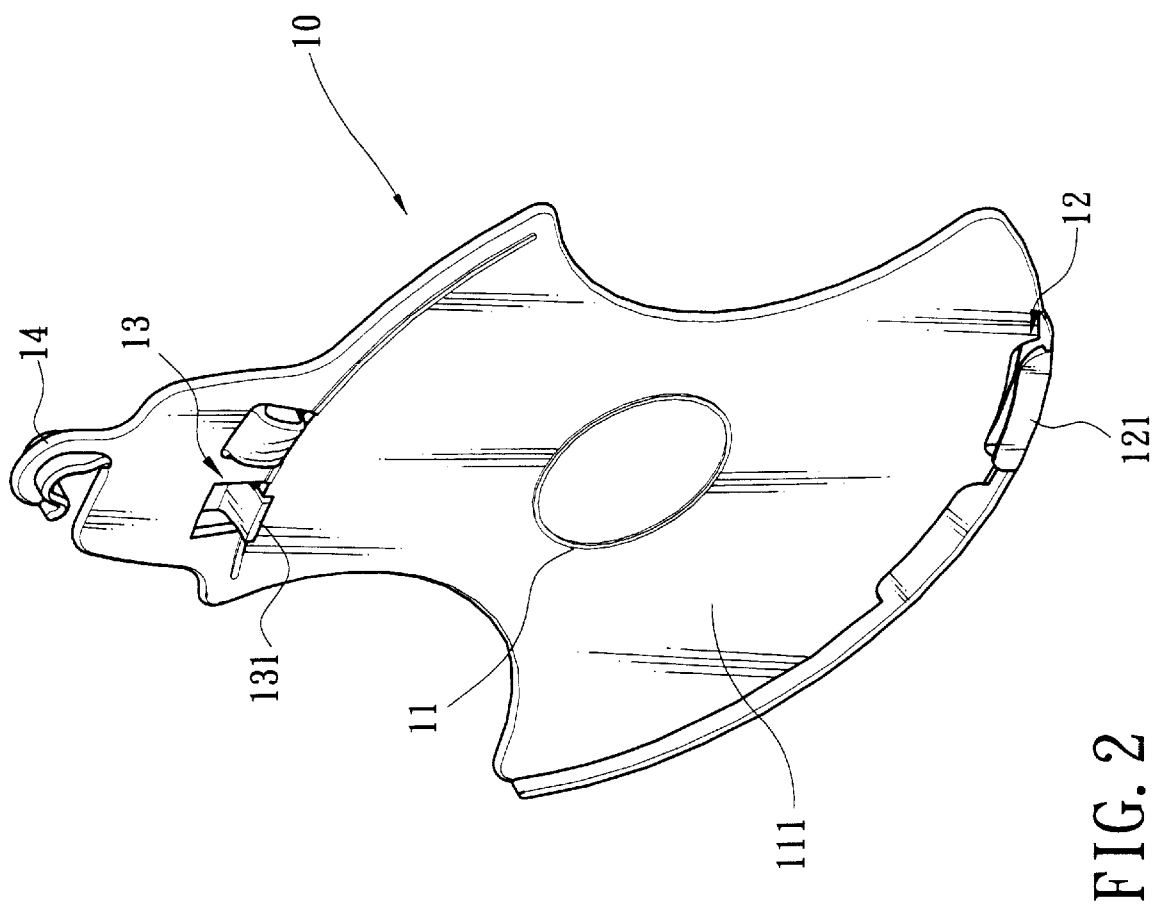
FIG. 2 is a perspective view of an optical disc holder according to the present invention.
Figure 3A:
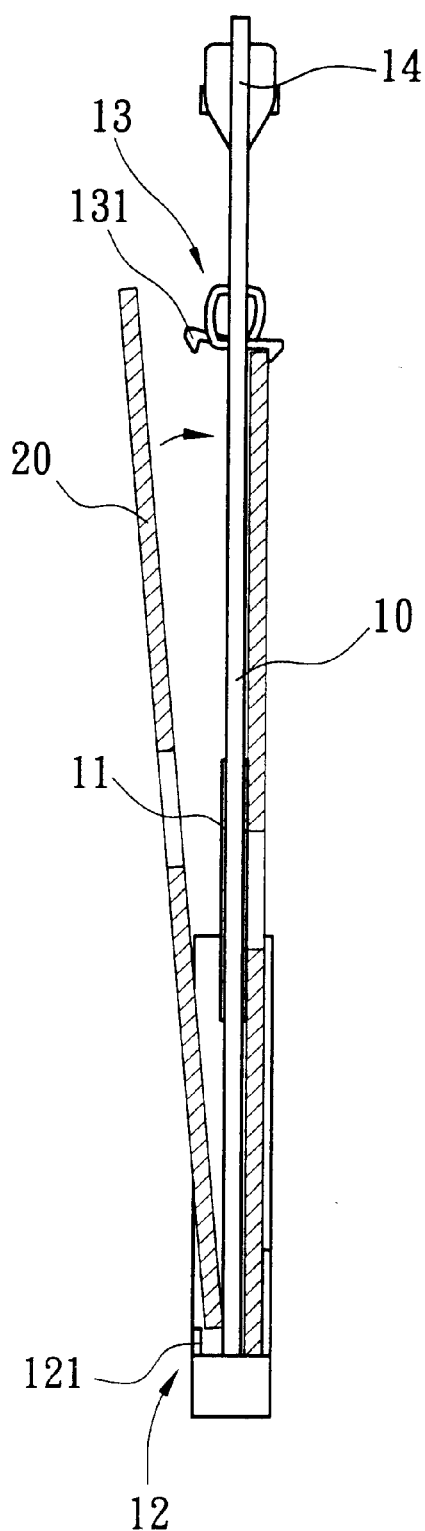
FIGS. 3A and 3B are sequential sectional side views showing an optical disc being stored into the disc holder.
Figure 4:
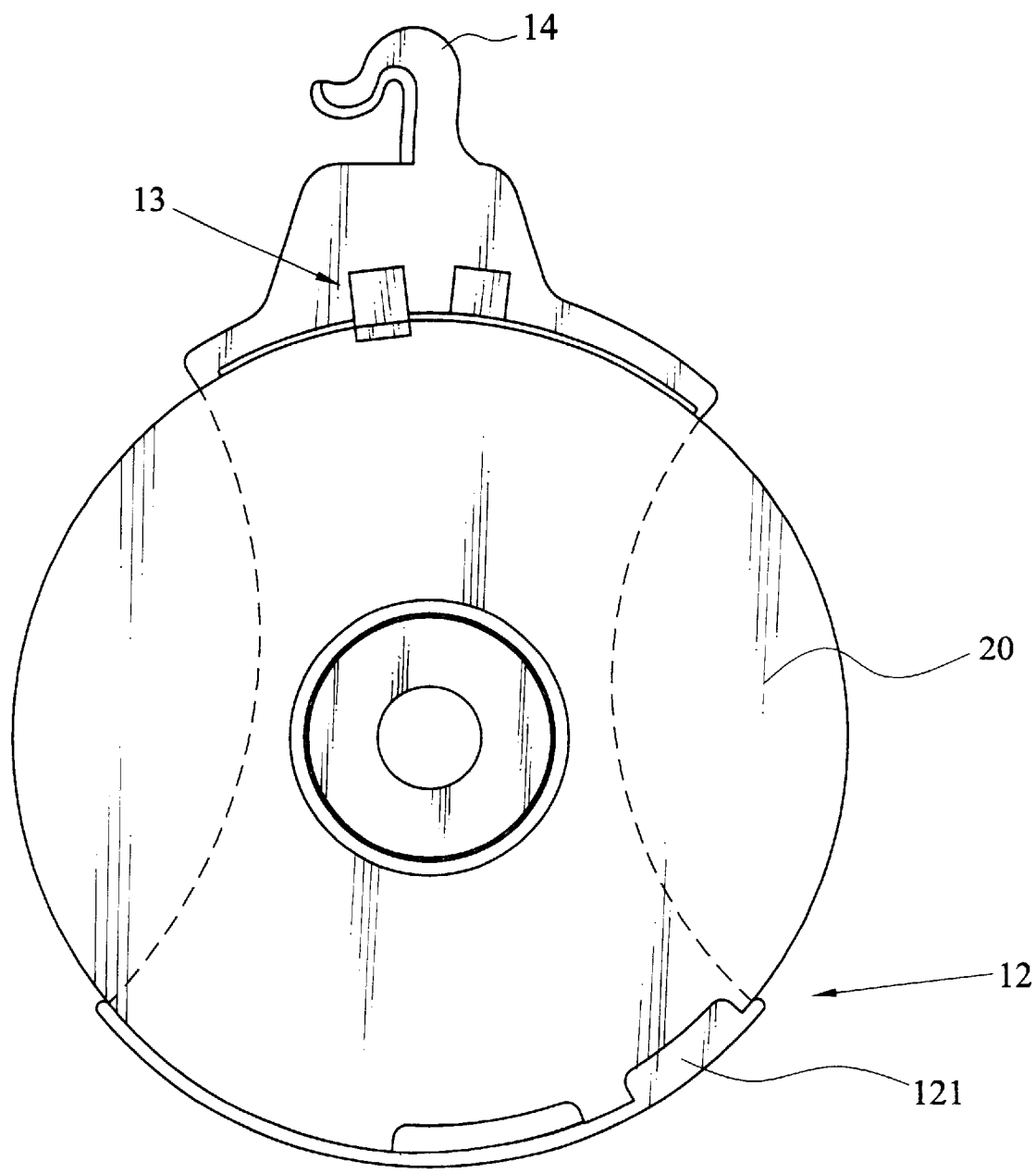
FIG. 4 is a plane view of a disc holder of the present invention holding an optical disc.

As shown in FIGS. 2, 3A and 4, an optical disc holder 10 according to the present invention is made of plastics by injection molding to be a unitary piece of a plate shape. The size of the holder 10 is close to the size of the optical disc 20 but with a longitudinal measurement larger than the diameter of the disc 20, and a latitudinal measurement smaller than the diameter thereof.

At the center of the carrier plate 111, a spacing ring 11 extrudes from the surface of the plate. On opposite positions along the longitudinal direction on one side of the carrier plate 111, a carrying portion 12 and a resilient portion 13 are integrally formed for holding the rim of the disc 20 by the resilient force of the resilient portion 13. At the longitudinal end of the carrier plate 111, a unitary hook 14 is integrally formed for hanging the optical disc holder 10. The spacing ring 11 facing to the central disused portion of the optical disc 20 ensures a clearance formed between the disc 20 and the plate 111 to prevent scratch damage to the disc 20. The carrying portion 12 includes a wall and lower stopper 121 extending from the periphery of the plate 111 to form a holding member for positioning and holding a part of rim of the disc 20. The resilient portion 13 is formed in the periphery of the plate 111 and on the radially opposite position to the carrying portion 12 for fastening the disc 20 in place. The resilient portion 13 provides a grasping force in its natural position for holding the disc 20, and can be pushed to release the disc 20. An upper stopper 131 is formed on the end of the resilient portion 13 for grasping the disc 20. The unitary hook 14 extends from the plate 111 and integrally formed with a downward opening to be hung on a rod or rope, for example, a rod settled in a drawer or supporting frame, so as to store optical disc 20 on the optical disc holder 10 in a hanging manner.

Figure 3B:
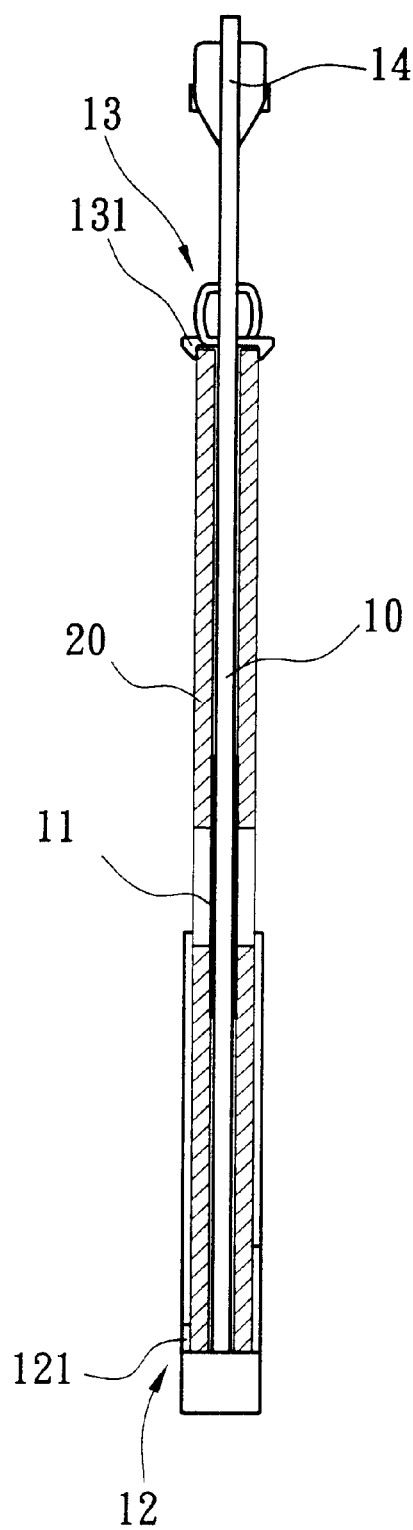

The operation of storing an optical disc 20 in the disc holder 10 is shown in FIGS. 3A, 3B. In FIG. 3A, another optical disc 20 has been stored on the back side of the holder 20. Now, on the topside, the user can hold the optical disc 20 in a tilted angle to have one end of the disc 20 inserted into the carrying portion 12 and held by the lower stopper 121. Then, use the finger of the hand which carries the holder, and push the back of resilient portion 13 to bend the resilient portion 13 outward till the disc 20 is moved into the place and fixed by the upper stopper 131. The lower stopper 121 of the carrying portion 12, and the upper stopper 131 of the resilient portion 13 grasp the rim of the optical disc 20 at the 1 mm width circular outer disused portion thereof and firmly fix the disc 20.

As shown in FIG. 4, since the latitudinal measurement of the disc holder 10 is smaller than the size of the disc 20, two portions of the disc 20 are exposed to be easily grasped by the user when the disc 20 is to be inserted or removed from the disc holder 10. When removing the disc 20, the upper stopper 131 of the resilient portion 13 can be bent to release one end of the disc 20, then the other end of the disc 20 can be removed from the carrying portion 12.

Figure 5:
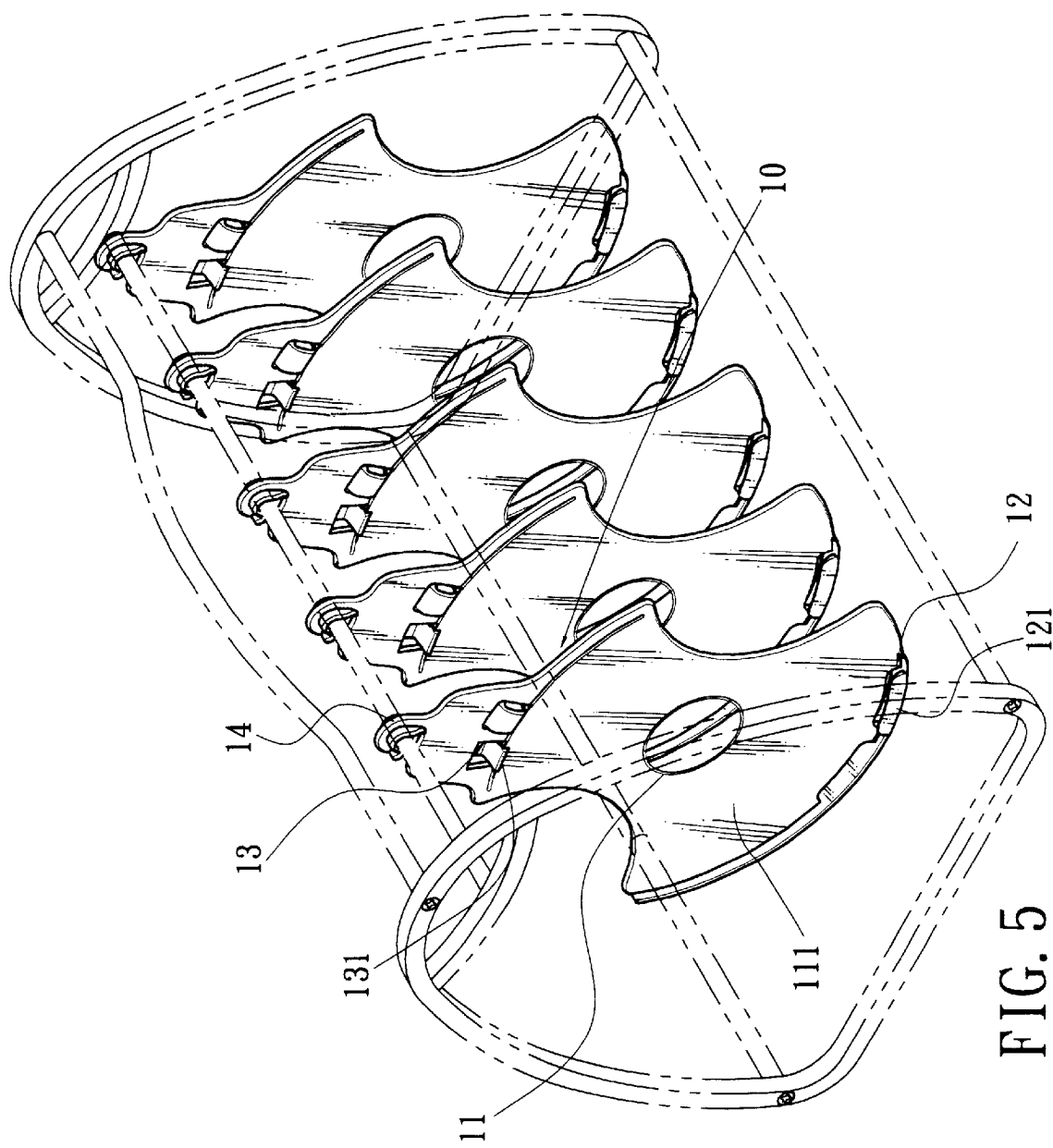
FIG. 5 is a perspective view showing a using condition of a disc holder of the present invention.

As the disc 20 being stored in the disc holder 10, the disc holder 10 can be hung on a rod or a rope for storage. As shown in FIG. 5, the rod settled in a frame and the disc holder 10 can be hung on the rod by the unitary hook 14. So the frame can collect plurality disc holder 10 on the rod. And the disc holder 10 can be hung on the rod without distant and directional restrictions by the unitary hook 14.

As shown in the drawings, the disc holder 10 can be formed into a two-disc holder. It includes two spacing rings 11 extruding respectively from both sides of the plate 111; two carrying portions 12 and two resilient portions 13 formed on both sides. Therefore, two optical discs 20 can be held on both sides of the disc holder 10.

As described above, the disc holder according to the present invention utilizes carrying portions and resilient portions on a plate carrier to fix optical discs by the outer disused portions of the optical discs, instead of using grasping fingers to hold the center holes. The optical disc holder can be made into a unitary piece directly by injection molding without the need of further elements or assembly. Therefore, it simplifies the production, lowers the cost, saves storing space of disc, and to be novel and practical.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disc holder for storing at least one disc, the holder comprising:

a carrier plate, having a front and a back side;

a carrying portion and a stopper integrally formed on a rim of the carrier plate for holding a part of a rim of the disc;

a resilient portion integrally formed on the carrier plate, the resilient portion being at an opposite position to the carrying portion of the carrier plate, the carrier plate being accessible from both the front and back sides of the carrier plate; and a hook integrally formed on an outer portion of the carrier plate, for hanging the disc holder.

2. The disc holder as recited in claim 1, wherein the disc holder is an optical disc holder for holding at least one optical disc.

3. The disc holder as recited in claim 1, wherein the hook is received on a rod or rope for hanging the disc holder.

4. The disc holder as recited in claim 1, wherein the resilient portion is movable between an open position and a closed position by an operator manipulating the resilient portion either from the front side or the back side of the carrier plate, the resilient portion extends, through an opening in the carrier plate.

5. The disc holder as recited in claim 4, wherein the resilient portion has an upper stopper provided on a front side of the carrier plate and has a back portion provided on the rear side of the carrier plate, the resilient portion being movable to the open position by an operator either pushing the back portion of the resilient portion or by an operator lifting the upper stopper.

6. The disc holder as recited in claim 1, wherein the carrier plate has a longitudinal measurement larger than a diameter of a stored disc and a latitudinal measurement smaller than a diameter thereof.

7. The disc holder as recited in claim 1, wherein the resilient portion further includes an upper stopper.

8. The disc holder as recited in claim 1, wherein the carrier plate includes a spacing ring extruding from a surface of the carrier plate at a center thereof.

9. The disc holder as recited in claim 1, wherein both sides of the carrier plate are formed with a carrying portion and a resilient portion so as to be a two-disc holder.

10. The disc holder as recited in claim 9, wherein a pair of resilient portions are provided with each pair extending through holes provided in the carrier plate, a first disc being receivable in one of the pair of resilient portions and a second disc being receivable in another of the pair of resilient portions.

* * * * *